(12) United States Patent
Lin et al.

(10) Patent No.: US 12,460,544 B2
(45) Date of Patent: Nov. 4, 2025

(54) MECHANICAL CONTINUOUS MINING DEVICE INTEGRATING MICROWAVES AND CUTTER HEADS, AND USE METHOD

(71) Applicant: Northeastern University, Shenyang (CN)

(72) Inventors: Feng Lin, Shenyang (CN); Xiating Feng, Shenyang (CN); Chengxiang Yang, Shenyang (CN); Jiuyu Zhang, Shenyang (CN); Tianyang Tong, Shenyang (CN); Yunchan Ao, Shenyang (CN); Juan He, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 18/259,760

(22) PCT Filed: May 18, 2023

(86) PCT No.: PCT/CN2023/094961
§ 371 (c)(1),
(2) Date: Jun. 28, 2023

(87) PCT Pub. No.: WO2024/234361
PCT Pub. Date: Nov. 21, 2024

(65) Prior Publication Data
US 2024/0392683 A1    Nov. 28, 2024

(30) Foreign Application Priority Data
May 17, 2023  (CN) .......................... 202310552554.1

(51) Int. Cl.
*E21C 37/16* (2006.01)

(52) U.S. Cl.
CPC .................................. *E21C 37/16* (2013.01)

(58) Field of Classification Search
CPC .......... E21C 37/16; E21C 25/16; E21C 47/00; E21C 25/18; E21C 35/00; E21C 39/00; E21C 41/30; Y02P 70/10
See application file for complete search history.

(56) References Cited

U.S. PATENT DOCUMENTS

| 10,428,654 B2 * | 10/2019 | Feng | ........................ E21C 37/16 |
| 2020/0040717 A1 * | 2/2020 | Feng | ........................ E21B 36/04 |

FOREIGN PATENT DOCUMENTS

| CN | 107218054 A | 9/2017 | |
| CN | 109668754 A * | 4/2019 | .......... G01M 99/005 |

(Continued)

*Primary Examiner* — Octavia Hollington
(74) *Attorney, Agent, or Firm* — MUNCY, GEISSLER, OLDS & LOWE, P.C.

(57) ABSTRACT

A mechanical ore sample testing device integrating microwaves and cutter heads, and a use method are provided. The mechanical ore sample testing device comprises an equipment platform, a cutter head cutting system, a microwave fracturing system, a loading device and a cantilever crane. The microwave fracturing system and the cutter head cutting system are fixed to the equipment platform, and the loading device and the cantilever crane are mounted at a front end of the equipment platform. A microwave mechanical longwall mining method for a metallic ore is provided. Microwaves move in sync with machines to break a rock, microwave fracturing methods comprise high-power microwave integral fracturing and local rapid fracturing of soft microwave coaxial lines in the cutter heads; and a lateral cutting method of an ore body by a cutter head technology is applied, a mechanical rock breaking principle is changed from previous extrusion breaking to tension breaking.

6 Claims, 9 Drawing Sheets

(56) References Cited

FOREIGN PATENT DOCUMENTS

| | | | | | |
|---|---|---|---|---|---|
| CN | 111624087 | A | * | 9/2020 | ............. G01N 33/24 |
| CN | 111811974 | A | * | 10/2020 | ............... G01N 3/58 |
| CN | 112378808 | A | * | 2/2021 | ............. G01N 3/068 |
| CN | 113063618 | A | | 7/2021 | |
| CN | 115290752 | A | * | 11/2022 | ............... E21D 9/11 |

* cited by examiner

MECHANICAL CONTINUOUS MINING DEVICE INTEGRATING MICROWAVES AND CUTTER HEADS, AND USE METHOD

BACKGROUND OF THE INVENTION

1. Field of the Invention

The disclosure relates to the technical field of rock breaking, in particular to a mechanical ore sample testing device integrating microwaves and cutter heads, and a use method.

2. The Prior Arts

The excavation process of metallic ore mining is to break an ore from an ore body. At present, common excavation methods comprise a blasting method and a mechanical rock breaking method. With development of metallic ore mining towards deep areas, conventional drilling and blasting methods cannot meet the requirements of safety and environmental protection, and the stability of surrounding rocks becomes more and more important. Mechanical excavation instead of conventional blasting excavation has become an inevitable trend. However, mechanical excavation is greatly influenced by properties of a rock mass, and especially the strength and abrasiveness of the rock mass have serious impact on the applicability of a mechanical tool. At present, common mechanical excavation equipment for metal mines and tunnels comprises tunnel boring machines (TBM), boom-type roadheaders and hard rock miners, and all of rock breaking machines are to break the rock through forward extrusion. The rock is essentially broken by extrusion, while the compressive strength of a hard rock is high and far greater than tensile strength. Therefore, a mechanical excavation tool is serious in wear for a hard rock mine, and the pushing speed is low, which prevents mechanical excavation from being applied and promoted in the mines.

In order to achieve application of the mechanical mining methods to the hard rock mine, mining equipment manufacturers are performing a series of mechanical equipment developments, thereby mostly optimizing design from materials and structures of a tool. Another feasible solution is to reduce physical and mechanical properties of the rock mass before excavation. Studies have shown that reduction of the strength and abrasiveness of the rock can lead to direct reduction in a wear rate of the tool. Thus, many rock pretreatment methods were developed in recent decades, and comprise water jet rock breaking, laser rock breaking and microwave rock breaking. All the methods lead to cracks in the rock mass to reduce strength of the rock mass before mechanical excavation, and therefore the tool wear is reduced. Among these methods, the microwave rock breaking has broad application prospects due to its advantages of no contact, environmental protection and easy loading on the tool. Therefore, it is urgent to develop a mechanical mining device capable of achieving reduction of tool wear and increase of tunnelling speed for hard rock mines.

SUMMARY OF THE INVENTION

The disclosure aims to provide a mechanical ore sample testing device integrating microwaves and cutter heads, and a use method. According to the device, microwaves are applied to pre-break an ore forward, and the cutter heads are applied to cut the ore along an ore body laterally, so that the problems of wear of a mechanical mining tool and low tunnelling speed are solved.

In order to realize the purpose, the disclosure provides the following technical solution:

The mechanical ore sample testing device integrating microwaves and cutter heads comprises an equipment platform, a cutter head cutting system, a microwave fracturing system, a loading device and a cantilever crane, wherein the microwave fracturing system and the cutter head cutting system are fixed to the equipment platform, and the loading device and the cantilever crane are mounted at a front end of the equipment platform.

The equipment platform comprises a base, equipment moving guide rails and a horizontal moving platform, wherein the base is fixed to a ground, and the equipment moving guide rails are fixedly mounted on an upper surface of the base; a bottom of the horizontal moving platform is connected with the equipment moving guide rails in a sliding manner, and horizontal moving drives are symmetrically arranged along the horizontal moving platform; and one end of each horizontal moving drive is fixed to the base by a support block, and another end of each horizontal moving drive is hinged with a side wall of the horizontal moving platform.

The microwave fracturing system comprises a high-power microwave generator and a low-power microwave generator, wherein the high-power microwave generator is mounted on a microwave platform by sliding rails; moving drives are symmetrically arranged along the high-power microwave generator, one end of each moving drive is fixed to the microwave platform by a support block, and another end of each moving drive is hinged with a side wall of the high-power microwave generator; the microwave platform is connected with a horizontal moving platform by vertical support beams and diagonal support beams; an output port of the high-power microwave generator is sequentially connected with an automatic impedance regulator, a rectangular waveguide and a horn microwave antenna, and an infrared temperature sensor and a laser range finder are arranged at a port of the horn microwave antenna; and the low-power microwave generator is fixed to a top of a case.

The cutter head cutting system comprises a cutting rotating platform, wherein a bottom of the cutting rotating platform is mounted on a horizontal moving platform; a top of the cutting rotating platform is connected with one end of a pitch oil cylinder, and another end of the pitch oil cylinder is connected with a bottom of a cutting arm; and a rotating disc is arranged at a front end of the cutting arm, the cutter heads are mounted at a front end of the rotating disc, and a rear end of the cutting arm is connected with a case.

The cutter heads comprise driven cutter heads and fixed cutter heads, wherein the driven cutter heads and the fixed cutter heads are alternately arranged on the rotating disc; all the cutter heads are located on a concentric circle of the rotating disc, and a maximum distance between the cutter heads and a center of a circle of the rotating disc is greater than a radius of the rotating disc; and the fixed cutter heads only revolve with the rotating disc, and the driven cutter heads are driven to perform self-rotation during cutting a rock mass while revolving with the rotating disc.

The mechanical ore sample testing device integrating microwaves and cutter heads further comprises a case. The case comprises a first driving motor, a second driving motor and a rotating shaft which are located in the case, wherein the first driving motor is fixedly mounted on a bottom plate of the case and the second driving motor is fixedly mounted on a top plate of the case; a first driving gear is mounted at one end of an output shaft of the first driving motor and a second driving gear is mounted at one end of an output shaft of the second driving motor, and a first driven gear meshed with the first driving gear is connected to a rear end of the rotating shaft by a key; a front end of the rotating shaft is located in a cutting arm, and the rotating shaft and the cutting arm are rotatably mounted by a bearing; the front end of the rotating shaft is fixedly connected with a rear end of a rotating disc, and a fixed waveguide is fixedly mounted on a side wall of a rear end of the case; a front end of the fixed waveguide extends into the case, and the front end of the fixed waveguide is mounted at a rear end of a rotary waveguide; the rotary waveguide penetrates through a through hole in a support plate, and a bottom of the support plate is fixed to the case; an input end of the rotary waveguide is allowed to remain stationary under a self-rotation condition of the rotary waveguide, and an output end rotates synchronously with the rotary waveguide; the microwaves are transmitted without loss under the self-rotation condition; gear teeth meshed with the second driving gear are machined on a peripheral surface of the rotary waveguide circumferentially, and a low-power microwave generator is mounted at another end of the fixed waveguide; a front end of the rotary waveguide is connected with a rear end of a rigid waveguide, and a microwave network distributor is mounted at a front end of the rigid waveguide, and the microwave network distributor is divided into a plurality of output ports connected with a plurality of soft microwave coaxial lines; and the soft microwave coaxial lines penetrate through through holes formed in the rotating shaft and the fixed cutter heads in sequence.

The loading device comprises a load-bearing base mounted on a base of the equipment platform, wherein the load-bearing base is slidably mounted on a bottom base through guide rails symmetrically arranged at a top of the load-bearing base, and pushing drives are symmetrically arranged on the load-bearing base; the pushing drives are pushing oil cylinders and are symmetrically arranged along the bottom base; one end of each pushing drive is fixed to the load-bearing base by a support block, and another end of each pushing drive is hinged with a side wall of the bottom base; a load-bearing framework is arranged at a top of the bottom base, and upper pressing plate oil cylinders arranged towards an ore sample are mounted at a top end of the load-bearing framework; and an upper pressing plate is mounted at ends of piston rods of the upper pressing plate oil cylinders, a left pressing plate oil cylinder arranged towards the ore sample is mounted at a side plate of the load-bearing framework, and a left pressing plate is mounted at one end of a piston rod of the left pressing plate oil cylinder.

The use method of the mechanical ore sample testing device integrating microwaves and cutter heads comprises the following steps:

step 1: placing an ore sample on a loading device by a cantilever crane, and pressing the ore sample by the loading device, wherein a vertical pressing force is determined based on stress of a working surface of a site where the ore sample is located;

step 2: without turning on the microwaves, remaining a same pushing speed and a same cutting depth, guaranteeing the same cutting depth by controlling the loading device to move, rotating a cutting arm by a pitch angle, and regulating an angle between the ore sample and a plane where the cutter heads are located, wherein a cutter head cutting system starts to horizontally move from a side surface of the ore sample to cut the ore sample by a horizontal moving platform of an equipment platform, an average pushing force for cutting is recorded by a force sensor mounted at each cutter head of the cutter head cutting system, data is transmitted to a computer, and an angle $\alpha$ of the cutter heads is determined when a pushing force for cutting is minimum;

step 3: setting an upper limit F of the pushing force for cutting, and fixing the angle $\alpha$ of the cutter heads, wherein cutting is performed at different cutting depths and different pushing speeds without the microwaves to obtain a maximum yield M at the time of reaching the upper limit F of the pushing force for cutting;

step 4: starting the high-power microwave generator, fixing the pushing speed, regulating the angle $\alpha$ of the cutter heads to ensure that the ore sample is not cut, irradiating the ore sample at different power and working distances under a condition that a microwave fracturing system moves, monitoring reflection power by an automatic impedance regulator, monitoring a surface temperature of the ore sample irradiated by the microwaves by an thermal infrared imager, setting an upper limit of the reflection power as R, and under a condition that the reflection power does not exceed the R, obtaining microwave power P and a working distance A when a surface temperature gradient of the ore sample is maximum;

step 5: selecting different pushing speeds based on the microwave power P and the working distance A of the high-power microwave generator to irradiate the ore sample by the microwaves, and when a macro-crack occurs on a surface of the ore sample, recording a pushing speed $V_L$ at this time;

step 6: performing synchronous cutting under an action of the microwaves, under conditions of remaining a yield as M at the microwave power P and the working distance A of the high-power microwave generator, a maximum output $P_m$ as microwave power of the low-power microwave generator, and the angle $\alpha$ of the cutter heads, regulating different pushing speeds and cutting depths, and recording a cutting depth Li and a pushing speed $V_1$ when the pushing force for cutting is minimum by the computer; and step 7: while using on site, adopting a microwave mechanical longwall mining method for a metallic ore, firstly, excavating a mechanical working space right ahead a working surface of an ore body, then excavating a travelling roadway and a ventilation roadway along two sides of the ore body respectively, fixing a microwave mechanical mining device to a travelling device of a tunnel boring machine, performing operating according to design parameters obtained in the steps 1-6, fracturing the ore sample right ahead and on a side surface of the working surface of the ore body by the microwaves to generate cracks, cutting the ore sample by the cutter heads from the side surface of the working surface of the ore body, and arranging a conveyor belt on each of the working surface of the ore body and the travelling roadway, so that a cut ore sample can be carried away.

The device and the method, adopting the technical solution, have the benefits that:

(1) the microwave mechanical longwall mining method for a metallic ore is provided, wherein microwaves move in sync with machines to break a rock, microwave fracturing methods comprise high-power microwave integral fracturing and local rapid fracturing of soft microwave coaxial lines in the cutter heads, and therefore the cutting speed of the rock is increased greatly;

(2) a lateral cutting method of an ore body by a cutter head technology is applied, a mechanical rock breaking principle is changed from previous extrusion breaking to tension breaking, and the rock breaking cost is greatly reduced from the rock breaking principle; and (3) a cutter head structure applies a method for combining driven cutter heads and fixed cutter heads, when meeting an extremely hard rock, the driven cutter heads can rotate to avoid the situation that the cutter heads are damaged by hard cutting, the soft microwave coaxial lines are arranged in the fixed disk cutters, and cutting by the fixed cutter heads and local rapid fracturing by the microwaves of the extremely hard rock are achieved, so that the service life of the mechanical tool is prolonged without affecting the cutting speed.

Figure 1:
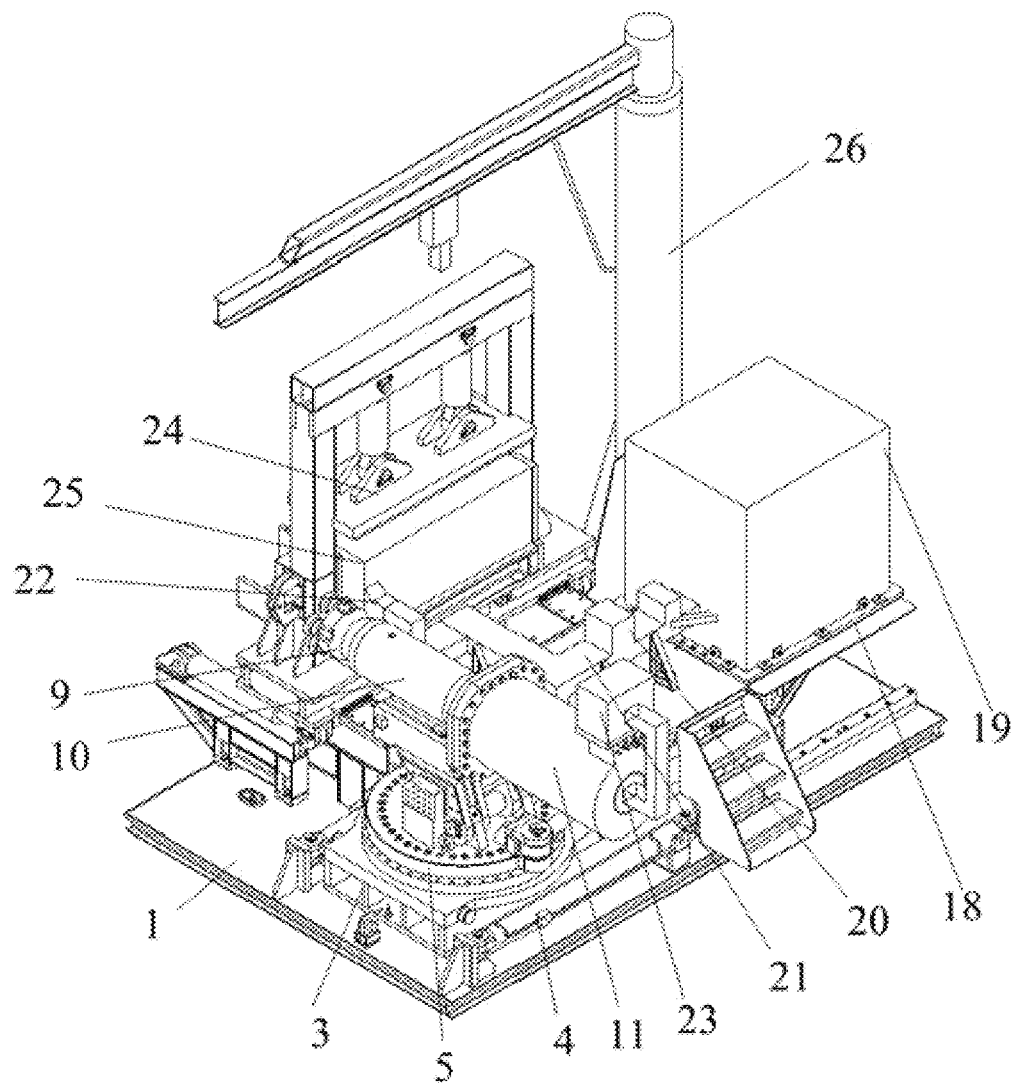
FIG. 1 is a perspective view of a mechanical ore sample testing device integrating microwaves and cutter heads according to the disclosure.
Figure 2:
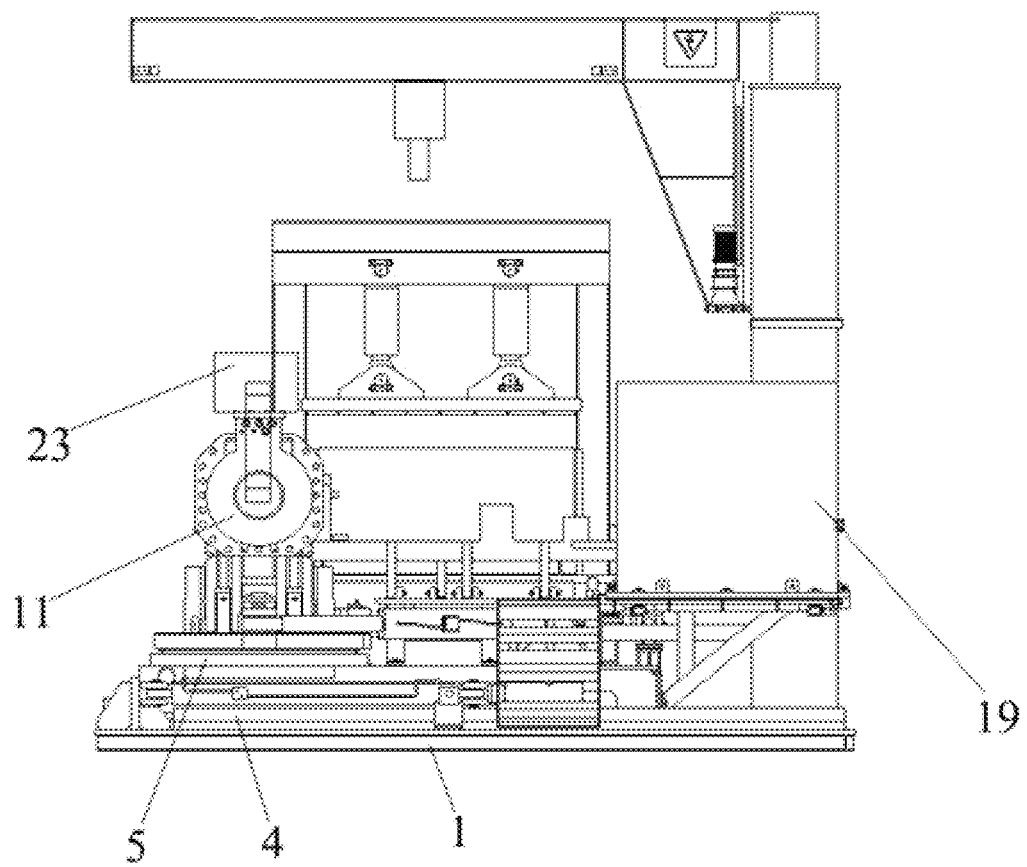
FIG. 2 is a front view of the mechanical ore sample testing device integrating microwaves and cutter heads according to the disclosure.
Figure 3:
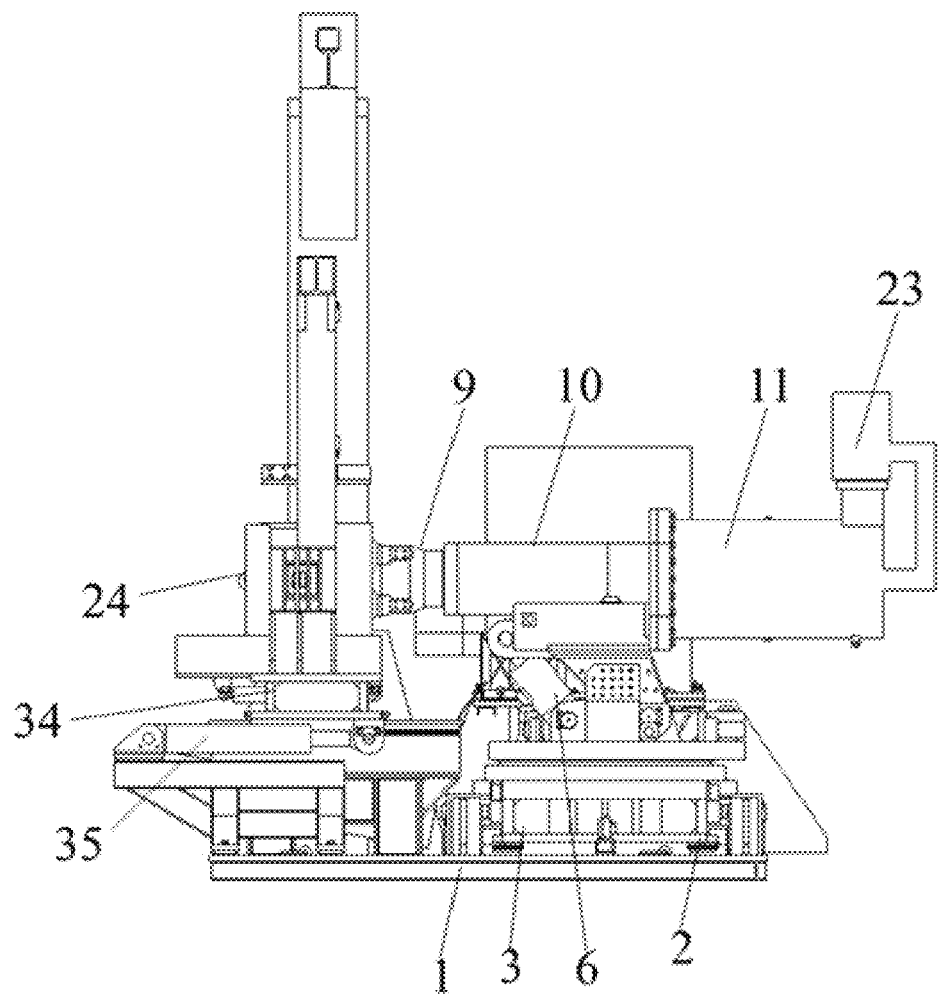
FIG. 3 is a side view of the mechanical ore sample testing device integrating microwaves and cutter heads according to the disclosure.
Figure 4:
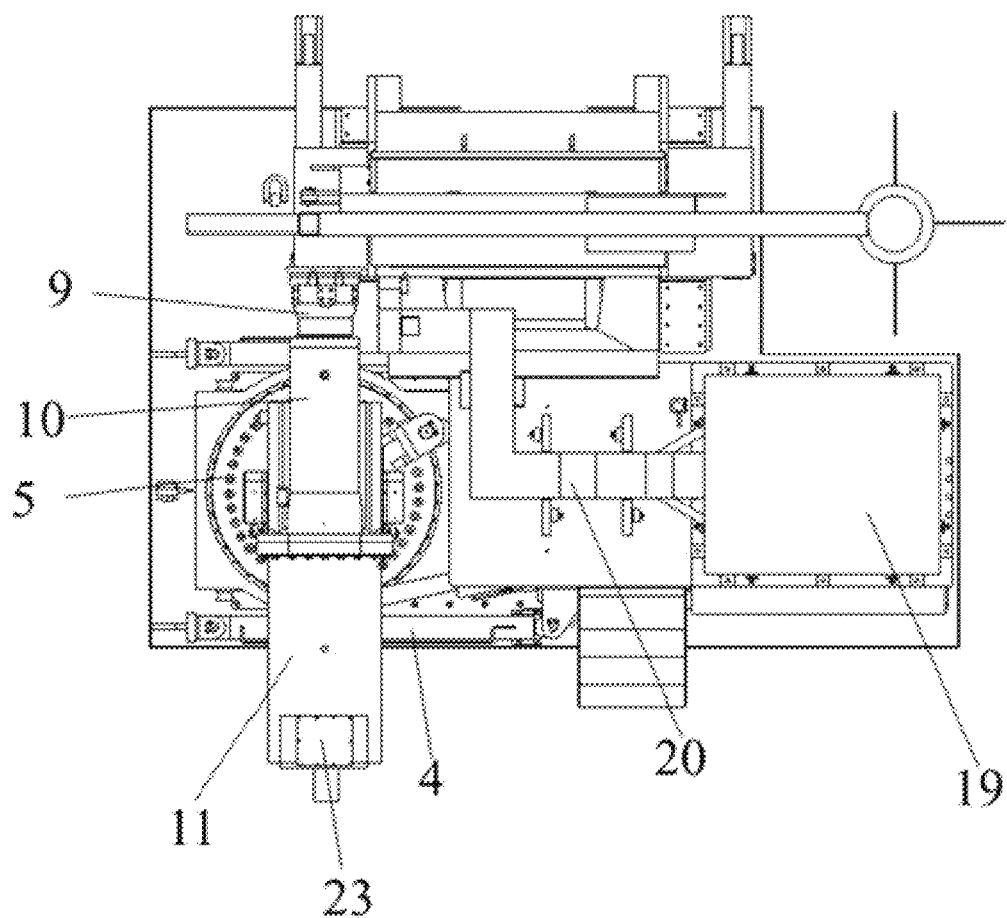
FIG. 4 is a top view of the mechanical ore sample testing device integrating microwaves and cutter heads according to the disclosure.
Figure 5:
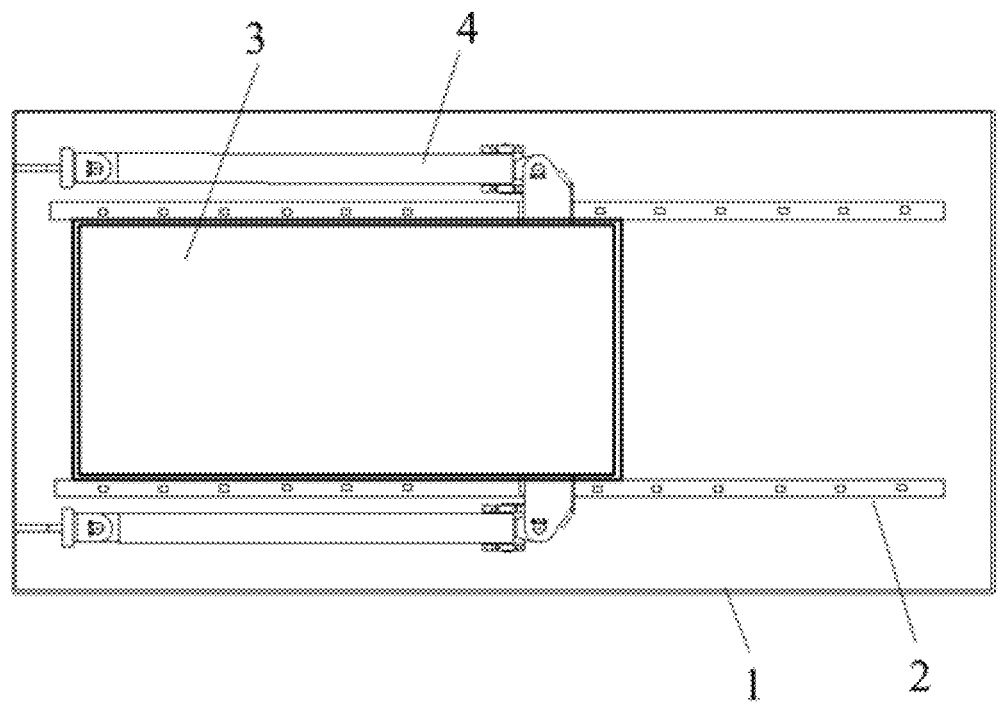
FIG. 5 is a schematic diagram of an equipment platform of the mechanical ore sample testing device integrating microwaves and cutter heads according to the disclosure.
Figure 6:
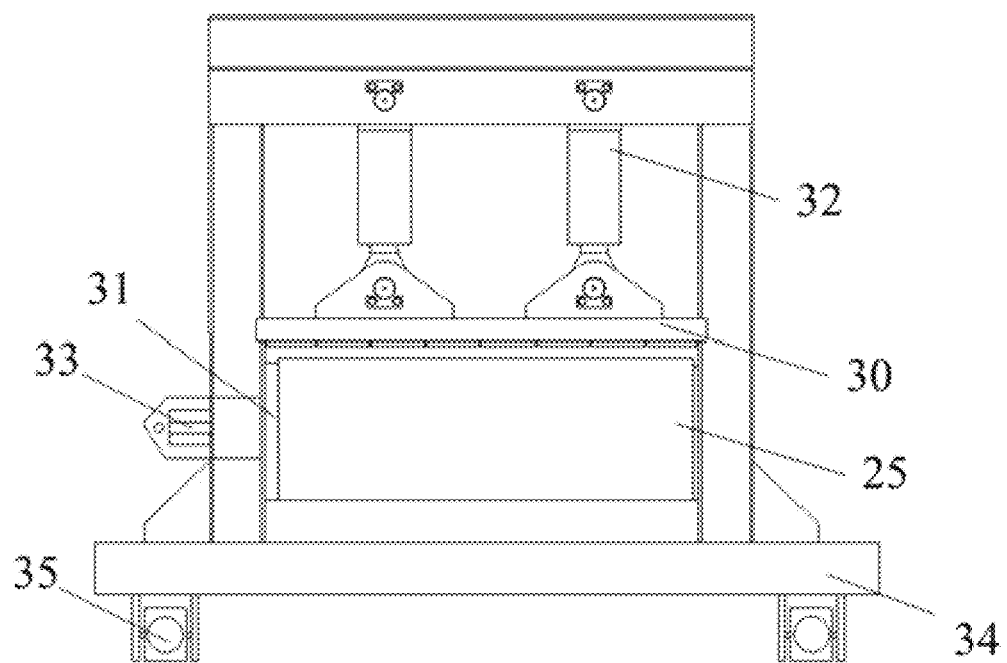
FIG. 6 is a schematic diagram of a loading device of the mechanical ore sample testing device integrating microwaves and cutter heads according to the disclosure.
Figure 7:
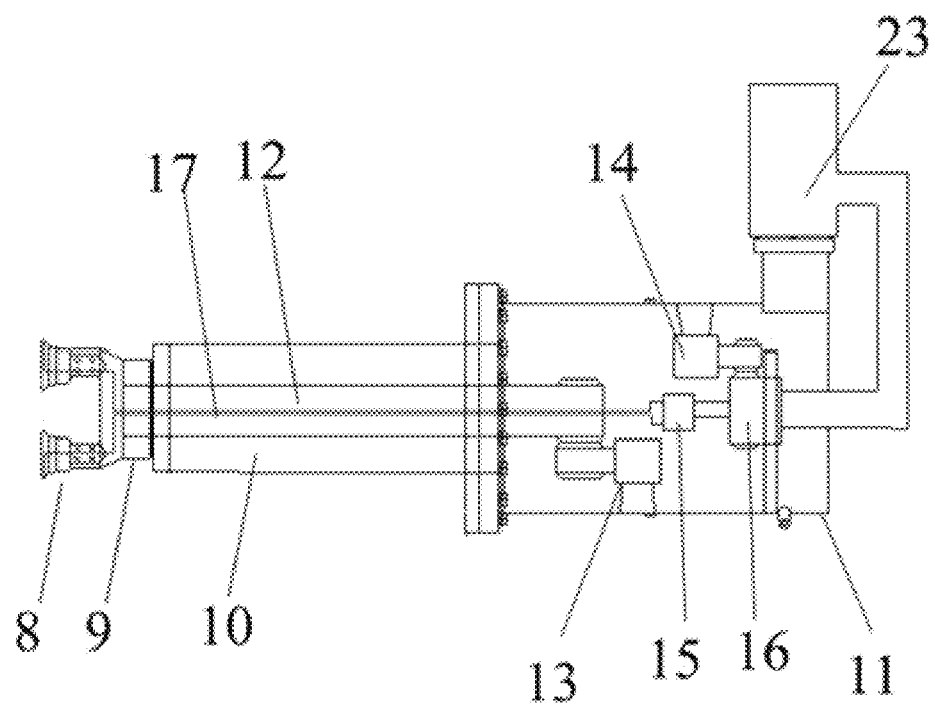
FIG. 7 is a schematic diagram of a cutter head cutting system of the mechanical ore sample testing device integrating microwaves and cutter heads according to the disclosure.
Figure 8:
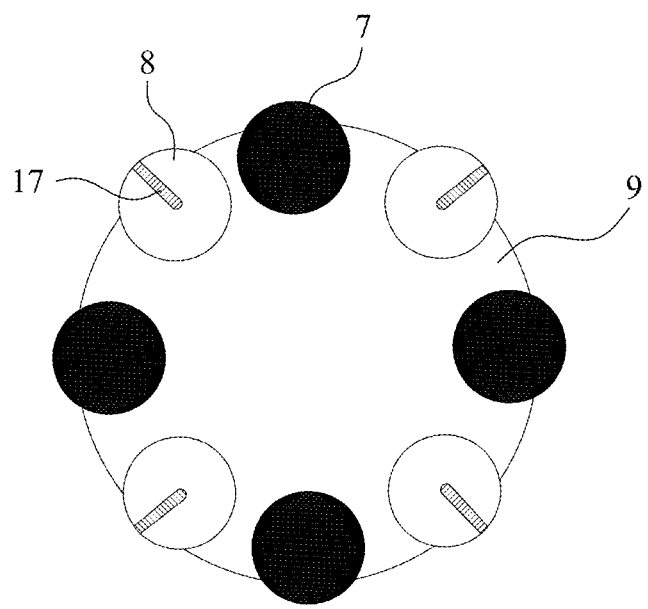
FIG. 8 is a cross-sectional diagram of a cutter head of the mechanical ore sample testing device integrating microwaves and cutter heads according to the disclosure.

In the drawings, 1: base; 2: equipment moving guide rail; 3: horizontal moving platform; 4: horizontal moving drive; 5: cutting rotating platform; 6: pitch oil cylinder; 7: driven cutter head; 8: fixed cutter head; 9: rotating disc; 10: cutting arm; 11: case; 12: rotating shaft; 13: first driving motor; 14: second driving motor; 15: microwave network distributor; 16: rotary waveguide; 17: soft microwave coaxial line; 18: microwave platform; 19: high-power microwave generator; 20: automatic impedance regulator; 21: rectangular waveguide; 22: horn microwave antenna; 23: low-power microwave generator; 24: loading device; 25: ore sample; 26: cantilever crane; 27: ore body; 28: crack; 29: conveyor belt; 30: upper pressing plate; 31: left pressing plate; 32: upper pressing plate oil cylinder; 33: left pressing plate oil cylinder; 34: bottom base; and 35: pushing oil cylinder.

DETAILED DESCRIPTION OF THE PREFERRED EMBODIMENT

The disclosure will be further described in detail with reference to drawings and embodiments.

As shown in FIG. 1 to FIG. 8, a mechanical ore sample testing device integrating microwaves and cutter heads comprises an equipment platform, a cutter head cutting system, a microwave fracturing system, a loading device 24 and a cantilever crane 26, wherein the microwave fracturing system and the cutter head cutting system are fixed to the equipment platform, and the loading device 24 and the cantilever crane 26 are mounted at a front end of the equipment platform.

The equipment platform comprises a base 1, equipment moving guide rails 2 and a horizontal moving platform 3, wherein the base 1 is fixed to a ground, and the equipment moving guide rails 2 are fixedly mounted on an upper surface of the base 1; a bottom of the horizontal moving platform 3 is connected with the equipment moving guide rails 2 through clamping grooves, and horizontal moving drives 4 are symmetrically arranged along the horizontal moving platform 3; in this embodiment, the horizontal moving drives 4 are telescopic oil cylinders, one end of each horizontal moving drive 4 is fixed to the base 1 by a support block, and another end of each horizontal moving drive 4 is hinged with a side wall of the horizontal moving platform 3; and through telescopic movement of a piston rod in each horizontal moving drive 4, the horizontal moving platform 3 is driven to move to drive a cutter head cutting system on the horizontal moving platform 3 to move synchronously with a microwave fracturing system.

The microwave fracturing system comprises a high-power microwave generator 19 and a low-power microwave generator 23, wherein the high-power microwave generator 19 is mounted on a microwave platform 18 by sliding rails; moving drives are symmetrically arranged along the high-power microwave generator 19, one end of each moving drive is fixed to the microwave platform 18 by a support block, and another end of each moving drive is hinged with a side wall of the high-power microwave generator 19; the microwave platform 18 is connected with the horizontal moving platform 3 by vertical support beams and diagonal support beams, and the vertical support beams are located at a top of the horizontal moving platform 3; the diagonal support beams are located on the side walls of the horizontal moving platform 3, and the microwave platform 18 is higher than the horizontal moving platform 3; an output port of the high-power microwave generator is sequentially connected with an automatic impedance regulator 20, a rectangular waveguide 21 and a horn microwave antenna 22, and an infrared temperature sensor and a laser range finder are arranged at a port of the horn microwave antenna 22; the high-power microwave generator 19 has a working frequency of 0.915 GHz and maximum power of 100 kW, and the high-power microwave generator 19 is dynamically controlled according to a distance monitored by the laser range finder, and moves in a direction being perpendicular to a working surface of a rock mass, so as to control a distance between the horn microwave antenna 22 and the surface of the rock mass; microwave reflection can be regulated to minimum by the automatic impedance regulator 20 in a microwave working process; and the low-power microwave generator 23 is fixed to a top of a case 11, and has a working frequency of 2.45 GHz and maximum output power of 20 kW.

The cutter head cutting system comprises a cutting rotating platform 5, wherein a bottom of the cutting rotating platform 5 is mounted on the horizontal moving platform 3; a top of the cutting rotating platform 5 is connected with one end of a pitch oil cylinder 6, and another end of the pitch oil cylinder 6 is connected with a bottom of a cutting arm 10, so as to achieve synchronous rotation of the cutting arm 10 and the cutting rotating platform 5 and pitching movement of the cutting arm 10 under a control of the pitch oil cylinder 6; a rotating disc 9 is arranged at a front end of the cutting arm 10, and the cutter heads are mounted at a front end of the rotating disc 9; and a rear end of the cutting arm 10 is connected with the case 11.

The cutter heads comprise driven cutter heads 7 and fixed cutter heads 8, wherein the driven cutter heads 7 and the fixed cutter heads 8 are alternately arranged on the rotating disc 9; all the cutter heads are located on a concentric circle of the rotating disc 9, and a maximum distance between the cutter heads and a center of a circle of the rotating disc 9 is greater than a radius of the rotating disc 9; the eight cutter heads comprise four fixed cutter heads 8 only revolving with the rotating disc 9 and four driven cutter heads 7 driven to perform self-rotation during cutting of the rock mass while revolving with the rotating disc 9.

The case 11 comprises a first driving motor 13, a second driving motor 14 and a rotating shaft 12 which are located in the case, wherein the first driving motor 13 is fixedly mounted on a bottom plate of the case 11 and the second driving motor 14 is fixedly mounted on a top plate of the case 11; a first driving gear is mounted at one end of an output shaft of the first driving motor 13 and a second driving gear is mounted at one end of an output shaft of the second driving motor 14, and a first driven gear meshed with the first driving gear is connected to a rear end of the rotating shaft 12 by a key; a front end of the rotating shaft 12 is located in the cutting arm 10, and rotatably mounted with the cutting arm 10 by a bearing; the front end of the rotating shaft 12 is fixedly connected with a rear end of the rotating disc 9, and a fixed waveguide is fixedly mounted on a side wall of a rear end of the case 11; a front end of the fixed waveguide extends into the case 11, and the front end of the fixed waveguide is mounted at a rear end of a rotary waveguide 16; the rotary waveguide 16 penetrates through a through hole in a support plate, and a bottom of the support plate is fixed to the case 11; an input end of the rotary waveguide 16 is allowed to remain stationary under a self-rotation condition, and an output end rotates synchronously with the rotary waveguide 16; the microwaves are transmitted without loss under the self-rotation condition; gear teeth meshed with the second driving gear are machined on a peripheral surface of the rotary waveguide 16 circumferentially, and the low-power microwave generator 23 is mounted at another end of the fixed waveguide; a front end of the rotary waveguide 16 is connected with a rear end of a rigid waveguide, and a microwave network distributor 15 is mounted at a front end of the rigid waveguide, and the microwave network distributor 15 is divided into a plurality of output ports connected with a plurality of soft microwave coaxial lines 17 respectively; the soft microwave coaxial lines 17 penetrate through through holes formed in the rotating shaft 12 and the fixed cutter heads 8 in sequence; and a rotating speed of the rotary waveguide 16 is the same as that of the rotating shaft 12, so as to ensure that the soft microwave coaxial lines 17 rotate synchronously with the rotating shaft 12.

The loading device 24 is used for pressing an ore sample 25, and the loading device 24 comprises a load-bearing base mounted on the base 1 of the equipment platform; the load-bearing base is slidably mounted on a bottom base 34 through guide rails symmetrically arranged at a top of the load-bearing base, and pushing drives are symmetrically arranged on the load-bearing base; the pushing drives are pushing oil cylinders 35 which are symmetrically arranged along the bottom base 34; one end of each pushing drive is fixed to the load-bearing base by a support block, and another end of each pushing drive is hinged with a side wall of the bottom base 34; a load-bearing framework is arranged at a top of the bottom base 34, and upper pressing plate oil cylinders 32 arranged by facing the ore sample 25 are mounted at a top end of the load-bearing framework; an upper pressing plate 30 is mounted at ends of piston rods of the upper pressing plate oil cylinders 32, and a left pressing plate oil cylinder 33 arranged by facing the ore sample 25 is mounted at a side plate of the load-bearing framework; a left pressing plate 31 is mounted at one end of a piston rod of the left pressing plate oil cylinder 33, and the ore sample 25 is loaded in a vertical direction by the upper pressing plate oil cylinders 32 and the ore sample 25 is loaded in a horizontal direction by the left pressing plate oil cylinder 33 of the loading device 24; and the loading device 24 is driven to move by the pushing oil cylinders 35, so as to control change in a cutting depth of the cutter heads.

In the process of cutting an ore body 27, the high-power microwave generator 19 widely irradiates a front side of the rock through the horn microwave antenna 22 to induce fracture, which reduces adhesion of a to-be-cut ore sample 25 to the ore body 27; the low-power microwave generator 23 locally irradiates the rock at the front end of each cutter head through the soft microwave coaxial lines 17 to induce fracture, which reduces force required for the cutter heads to cut into the ore body 27; the cutter head cutting system performs cutting from a side surface of the ore body 27 along a horizontal pushing direction; when meeting an extremely hard rock, the driven cutter heads 7 can rotate to avoid a situation that the cutter heads are damaged by hard cutting; and then, the extremely hard rock is locally and quickly fractured under an action of the microwaves transmitted through the soft microwave coaxial lines 17, and cut by the microwaves in cooperation with the fixed cutter heads 8.

Figure 9:
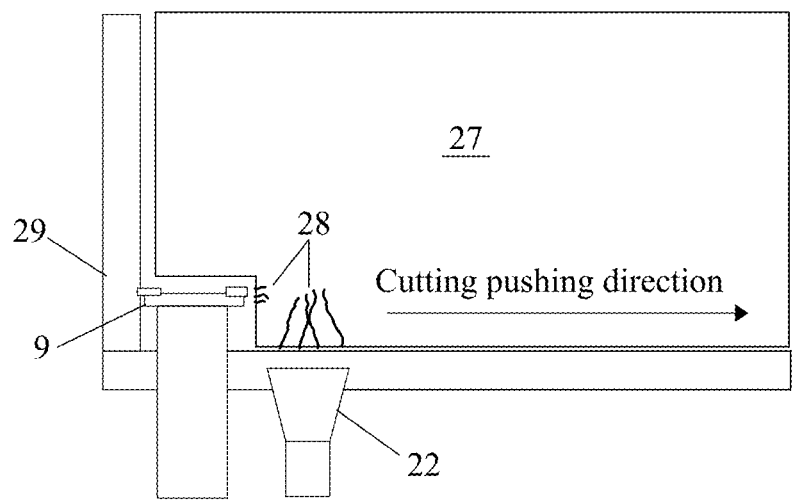
FIG. 9 is a diagram of a construction process of the mechanical ore sample testing device integrating microwaves and cutter heads according to the disclosure.

As shown in FIG. 9, a use method of the mechanical ore sample testing device integrating microwaves and cutter heads comprises the following steps:

step 1: placing an ore sample 25 on a bottom base 34 of a loading device 24 by a cantilever crane 26, and pressing the ore sample 25 by the loading device 24, wherein a vertical pressing force is determined based on stress of a working surface of a site where the ore sample 25 is located;

step 2: without turning on the microwaves, remaining a same pushing speed and a same cutting depth, guaranteeing the same cutting depth by controlling the loading device 24 to move, rotating a cutting arm 10 by a pitch angle, and adjusting an angle between the ore sample 25 and a plane where the cutter heads are located, wherein a cutter head cutting system starts to horizontally move from a side surface of the ore sample 25 to cut the ore sample 25 by a horizontal moving platform 3 of an equipment platform, an average pushing force for cutting is recorded by a force sensor mounted at each cutter head of the cutter head cutting system, data is transmitted to a computer, and an angle $\alpha$ of the cutter heads is determined when a pushing force for cutting is minimum;

step 3: setting an upper limit F of the pushing force for cutting, and fixing the angle $\alpha$ of the cutter heads, wherein cutting is performed at different cutting depths and different pushing speeds without the microwaves to obtain a maximum yield M at the time of reaching the upper limit F of the pushing force for cutting;

step 4: starting a high-power microwave generator 19 of a microwave fracturing system, fixing the pushing speed, regulating the angle α of the cutter heads to ensure that the ore sample 25 is not cut, irradiating the ore sample 25 at different power and working distances under a condition that the microwave fracturing system moves, monitoring reflection power by an automatic impedance regulator, monitoring a surface temperature of the ore sample 25 irradiated by the microwaves by an thermal infrared imager, setting an upper limit of the reflection power as R, and under a condition that the reflection power does not exceed the R, obtaining microwave power P and a working distance A when a surface temperature gradient of the ore sample 25 is maximum;

step 5: selecting different pushing speeds based on the microwave power P and the working distance A of the high-power microwave generator 19 to irradiate the ore sample 25 by the microwaves, and when a macro-crack occurs on a surface of the ore sample 25, recording a pushing speed $V_L$;

step 6: performing synchronous cutting under an action of the microwaves; under conditions of remaining a yield as M at the microwave power P and the working distance A of the high-power microwave generator 19, a maximum output $P_m$ as microwave power of a low-power microwave generator 23 of the microwave fracturing system, and the angle α of the cutter heads, regulating different pushing speeds and cutting depths, and recording a cutting depth Li and a pushing speed $V_1$ when the pushing force for cutting is minimum by the computer; and step 7: while using on site, adopting a microwave mechanical longwall mining method for a metallic ore, firstly, excavating a mechanical working space right ahead a working surface of an ore body 27, then excavating a travelling roadway and a ventilation roadway along two sides of the ore body 27 respectively, fixing a microwave mechanical mining device to a travelling device of a tunnel boring machine, performing operating according to design parameters obtained in the steps 1-6, fracturing the ore sample 25 right ahead and on a side surface of the working surface of the ore body 27 by the microwaves to generate cracks 28, cutting the ore sample 25 by the cutter heads from the side surface of the working surface of the ore body 27, and arranging a conveyor belt 29 on each of the working surface of the ore body 27 and the travelling roadway, so that a cut ore sample 25 can be carried away.

What is claimed is:

1. A mechanical ore sample testing device integrating microwaves and cutter heads, comprising:
   an equipment platform;
   a cutter head cutting system;
   a microwave fracturing system;
   a loading device; and
   a cantilever crane,
   wherein the microwave fracturing system and the cutter head cutting system are fixed to the equipment platform, and the loading device and the cantilever crane are mounted at a front end of the equipment platform,
   wherein the microwave fracturing system comprises a high-power microwave generator and a low-power microwave generator,
   wherein the high-power microwave generator is mounted on a microwave platform by sliding rails,
   wherein moving drives are symmetrically arranged along the high-power microwave generator, one end of each moving drive is fixed to the microwave platform by a support block, and another end of each moving drive is hinged with a side wall of the high-power microwave generator,
   wherein the microwave platform is connected with a horizontal moving platform by vertical support beams and diagonal support beams, and
   wherein an output port of the high-power microwave generator is sequentially connected with an automatic impedance regulator, a rectangular waveguide and a horn microwave antenna, and an infrared temperature sensor and a laser range finder are arranged at a port of the horn microwave antenna; and wherein the low-power microwave generator is fixed to a top of a case.

2. The device of claim 1, wherein the equipment platform comprises a base, equipment moving guide rails and the horizontal moving platform, wherein the base is fixed to a ground, and the equipment moving guide rails are fixedly mounted on an upper surface of the base; wherein a bottom of the horizontal moving platform is connected with the equipment moving guide rails in a sliding manner, and horizontal moving drives are symmetrically arranged along the horizontal moving platform; and wherein one end of each horizontal moving drive is fixed to the base by a support block, and another end of each horizontal moving drive is hinged with a side wall of the horizontal moving platform.

3. The device of claim 1, wherein the cutter head cutting system comprises a cutting rotating platform, wherein a bottom of the cutting rotating platform is mounted on the horizontal moving platform; wherein a top of the cutting rotating platform is connected with one end of a pitch oil cylinder, and another end of the pitch oil cylinder is connected with a bottom of a cutting arm; and wherein a rotating disc is arranged at a front end of the cutting arm, the cutter heads are mounted at a front end of the rotating disc, and a rear end of the cutting arm is connected with a case.

4. The device of claim 3, wherein the cutter heads comprise driven cutter heads and fixed cutter heads, wherein the driven cutter heads and the fixed cutter heads are alternately arranged on the rotating disc; wherein all the cutter heads are located on a concentric circle of the rotating disc, and a maximum distance between the cutter heads and a center of a circle of the rotating disc is greater than a radius of the rotating disc; and wherein the fixed cutter heads only revolve with the rotating disc, and the driven cutter heads are driven to perform self-rotation during cutting a rock mass while revolving with the rotating disc.

5. The device of claim 1, further comprising a case, wherein the case comprises a first driving motor, a second driving motor and a rotating shaft which are located in the case, wherein the first driving motor is fixedly mounted on a bottom plate of the case and the second driving motor is fixedly mounted on a top plate of the case; wherein a first driving gear is mounted at one end of an output shaft of the first driving motor and a second driving gear is mounted at one end of an output shaft of the second driving motor, and a first driven gear meshed with the first driving gear is connected to a rear end of the rotating shaft by a key; wherein a front end of the rotating shaft is located in a cutting arm, and the rotating shaft and the cutting arm are rotatably mounted by a bearing; wherein the front end of the rotating shaft is fixedly connected with a rear end of a rotating disc, and a fixed waveguide is fixedly mounted on a side wall of a rear end of the case; wherein a front end of the fixed waveguide extends into the case, and the front end of the fixed waveguide is mounted at a rear end of a rotary waveguide; wherein the rotary waveguide penetrates through a through hole in a support plate, and a bottom of the support plate is fixed to the case; wherein an input end of the rotary waveguide is allowed to remain stationary under a self-rotation condition of the rotary waveguide, and an output end rotates synchronously with the rotary waveguide; wherein the microwaves are transmitted without loss under the self-rotation condition; wherein gear teeth meshed with the second driving gear are machined on a peripheral surface of the rotary waveguide circumferentially, and a low-power microwave generator is mounted at another end of the fixed waveguide; wherein a front end of the rotary waveguide is connected with a rear end of a rigid waveguide, and a microwave network distributor is mounted at a front end of the rigid waveguide, and the microwave network distributor is divided into a plurality of output ports connected with a plurality of soft microwave coaxial lines respectively; and wherein the soft microwave coaxial lines penetrate through through holes formed in the rotating shaft and the fixed cutter heads in sequence.

6. The device of claim 1, wherein the loading device comprises a load-bearing base mounted on a base of the equipment platform, wherein the load-bearing base is slidably mounted on a bottom base through guide rails symmetrically arranged at a top of the load-bearing base, and pushing drives are symmetrically arranged on the load-bearing base; wherein the pushing drives are pushing oil cylinders and are symmetrically arranged along the bottom base; wherein one end of each pushing drive is fixed to the load-bearing base by a support block, and another end of each pushing drive is hinged with a side wall of the bottom base; wherein a load-bearing framework is arranged at a top of the bottom base, and upper pressing plate oil cylinders arranged towards an ore sample are mounted at a top end of the load-bearing framework; and wherein an upper pressing plate is mounted at ends of piston rods of the upper pressing plate oil cylinders, a left pressing plate oil cylinder arranged towards the ore sample is mounted at a side plate of the load-bearing framework, and a left pressing plate is mounted at one end of a piston rod of the left pressing plate oil cylinder.

* * * * *